(12) United States Patent
D'Mura et al.

(10) Patent No.: US 8,078,296 B2
(45) Date of Patent: Dec. 13, 2011

(54) DYNAMIC PROCEDURE SELECTION

(75) Inventors: Paul R. D'Mura, Glendale, AZ (US);
Gavan W. Hood, Upper Lockyer (AU);
Kenwood H. Hall, Hudson, OH (US);
Sujeet Chand, Brookfield, WI (US);
Michael D. Kalan, Highland Heights, OH (US); Kenneth S. Plache, Scottsdale, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1475 days.

(21) Appl. No.: 11/536,818

(22) Filed: Sep. 29, 2006

(65) Prior Publication Data

US 2008/0147207 A1    Jun. 19, 2008

(51) Int. Cl.
*G05B 19/42* (2006.01)

(52) U.S. Cl. ............... 700/83; 700/19; 700/20; 700/28; 700/86; 700/169

(58) Field of Classification Search .............. 700/83, 700/86, 19, 20; 717/177, 178, 101, 107, 717/110, 113
See application file for complete search history.

(56) References Cited

U.S. PATENT DOCUMENTS

| | | | |
|---|---|---|---|
| 5,485,620 A | 1/1996 | Sadre et al. | |
| 5,522,066 A | 5/1996 | Lu | |
| 5,530,861 A | 6/1996 | Diamant et al. | |
| 5,812,394 A | 9/1998 | Lewis et al. | |
| 5,946,681 A | 8/1999 | Shortrer | |
| 6,067,299 A | 5/2000 | DuRee | |
| 6,085,222 A | 7/2000 | Fujino et al. | |
| 6,104,962 A | 8/2000 | Sastry | |
| 6,154,684 A | 11/2000 | Schwenke et al. | |
| 6,269,254 B1 | 7/2001 | Mathis | |
| 6,477,435 B1 | 11/2002 | Ryan | |
| 6,539,271 B2 | 3/2003 | Lech et al. | |
| 6,553,268 B1 | 4/2003 | Schwenke et al. | |
| 6,868,538 B1 | 3/2005 | Nixon et al. | |
| 7,016,759 B2 | 3/2006 | Kaever et al. | |
| 7,043,311 B2 * | 5/2006 | Nixon et al. ................ | 700/83 |
| 7,080,066 B1 | 7/2006 | Scheurich et al. | |
| 7,089,530 B1 | 8/2006 | Dardinski et al. | |

(Continued)

FOREIGN PATENT DOCUMENTS

EP    1276026 A    1/2003

(Continued)

OTHER PUBLICATIONS

European Search report dated Nov. 20, 2009 for European Application No. EP 07 11 7192, 9 pages.

(Continued)

*Primary Examiner* — Dave Robertson
(74) *Attorney, Agent, or Firm* — Turocy & Watson LLP; Alexander R. Kuszewski; John M. Miller

(57) ABSTRACT

A dynamic selection component for an industrial automation system is provided. The system includes one or more abstraction layers that are executed by a controller, the abstraction layers specify higher level requirements of a process. At least one execution layer is provided that is responsive to the abstraction layers, where the execution layer includes one or more process components that are dynamically selectable at runtime in view of the higher level requirements of the process.

25 Claims, 14 Drawing Sheets

U.S. PATENT DOCUMENTS

| | | | |
|---|---|---|---|
| 7,096,465 B1* | 8/2006 | Dardinski et al. | 717/178 |
| 7,146,232 B2 | 12/2006 | Staron et al. | |
| 7,194,446 B1 | 3/2007 | Bromley et al. | |
| 7,225,037 B2 | 5/2007 | Shani | |
| 7,233,830 B1 | 6/2007 | Callaghan | |
| 7,272,815 B1* | 9/2007 | Eldridge et al. | 717/101 |
| 7,363,338 B2 | 4/2008 | Kaakani et al. | |
| 7,395,122 B2 | 7/2008 | Kreidler et al. | |
| 7,418,305 B2 | 8/2008 | Buesgen et al. | |
| 7,505,817 B2 | 3/2009 | McDaniel et al. | |
| 7,509,249 B2 | 3/2009 | Britt et al. | |
| 7,627,385 B2* | 12/2009 | McGreevy et al. | 700/20 |
| 7,653,008 B2* | 1/2010 | Patrick et al. | 370/254 |
| 2001/0034557 A1 | 10/2001 | Hudson et al. | |
| 2002/0059272 A1 | 5/2002 | Porter | |
| 2002/0156548 A1 | 10/2002 | Arackaparambil et al. | |
| 2003/0150927 A1 | 8/2003 | Rosen | |
| 2003/0163656 A1 | 8/2003 | Ganton | |
| 2004/0015568 A1 | 1/2004 | Kaakani et al. | |
| 2004/0139427 A1 | 7/2004 | Garvey | |
| 2004/0199925 A1 | 10/2004 | Nixon et al. | |
| 2004/0230328 A1 | 11/2004 | Armstrong et al. | |
| 2005/0080788 A1 | 4/2005 | Murata | |
| 2005/0125735 A1 | 6/2005 | Cohen et al. | |
| 2005/0234873 A1 | 10/2005 | Milligan | |
| 2005/0256735 A1* | 11/2005 | Bayne | 705/1 |
| 2006/0037008 A1 | 2/2006 | Stelzer et al. | |
| 2006/0179032 A1 | 8/2006 | Gottsman et al. | |
| 2006/0206448 A1 | 9/2006 | Hyder et al. | |
| 2006/0212146 A1 | 9/2006 | Johnson et al. | |
| 2006/0277289 A1 | 12/2006 | Bayliss et al. | |
| 2007/0011281 A1 | 1/2007 | Jhoney et al. | |
| 2007/0055757 A1 | 3/2007 | Mairs et al. | |
| 2007/0073850 A1 | 3/2007 | Callaghan et al. | |
| 2007/0089063 A1 | 4/2007 | Breyer | |
| 2007/0124475 A1 | 5/2007 | Syed et al. | |
| 2007/0142941 A1 | 6/2007 | McGreevy et al. | |
| 2007/0250630 A1 | 10/2007 | Blanding | |
| 2007/0256051 A1 | 11/2007 | Rojer | |
| 2008/0022151 A1 | 1/2008 | Stange et al. | |
| 2008/0040477 A1 | 2/2008 | Johnson et al. | |
| 2008/0079558 A1 | 4/2008 | Dorgelo et al. | |
| 2008/0082186 A1 | 4/2008 | Hood et al. | |
| 2008/0082577 A1 | 4/2008 | Hood | |
| 2008/0140230 A1 | 6/2008 | Bromley | |
| 2008/0201297 A1 | 8/2008 | Choi et al. | |
| 2008/0208361 A1 | 8/2008 | Grgic | |
| 2008/0208368 A1 | 8/2008 | Grgic | |
| 2009/0083843 A1 | 3/2009 | Wilkinson et al. | |
| 2010/0088104 A1 | 4/2010 | DeRemer et al. | |

FOREIGN PATENT DOCUMENTS

| | | |
|---|---|---|
| EP | 1422619 A | 5/2004 |
| EP | 1 772 785 A | 4/2007 |
| EP | 1 906 276 A2 | 4/2008 |
| EP | 1 936 496 A1 | 6/2008 |
| EP | 1 906 276 A3 | 12/2009 |
| EP | 2 169 597 A1 | 3/2010 |
| EP | 2 169 598 A1 | 3/2010 |
| EP | 2 169 599 A1 | 3/2010 |
| WO | 0195041 A1 | 12/2001 |
| WO | 02/31607 A | 4/2002 |
| WO | 2004086160 A1 | 10/2004 |

OTHER PUBLICATIONS

"Simatic, Working with STRP V5.1, Edition Aug. 2000, A5E00069681-03". Aug. 2000, Siemens, D-90327, Nurnberg, DE, XP002554626, 24 pages.

Fayad, et al. "HMI as a Maintenance Tool." Advances in Instrumentation and Control, Instrument Society of America, Research Triangle Park, US, vol 2, part 1, Jan. 1, 1998, pp. 119-134, XP000875207, ISSN: 1054-0032, p. 124, last paragraph—p. 133, last paragraph, 16 pages.

OA Dated Jan. 9, 2009 for U.S. Appl. No. 11/536,827, 18 pages.

OA dated Apr. 13, 2009 for U.S. Appl. No. 11/536,746, 23 pages.

OA dated Jan. 26, 2010 for U.S. Appl. No. 11/536,791, 39 pages.

OA dated Mar. 8, 2010 for U.S. Appl. No. 11/536,760, 19 pages.

OA dated Mar. 8, 2010 for U.S. Appl. No. 11/536,746, 21 pages.

OA dated Mar. 24, 2009 for U.S. Appl. No. 11/536,715, 38 pages.

OA dated Apr. 23, 2009 for U.S. Appl. No. 11/536,760, 22 pages.

OA dated Apr. 17, 2009 for U.S. Appl. No. 11/536,791, 37 pages.

Raymond Staron, et al. Use of an Agent Type Library for the Design and Implementation of Highly Flexible Control Systems. Last accessed on Oct. 10, 2008, 6 pages.

Marvin J. Schwenke, et al. Specifying a Control Program with High Level Graphical Editors. (c) 2001 Society of Automotive Engineers, Inc. Last accessed on Oct. 10, 2008, 9 pages.

Marvin J. Schwenke, et al. Use of a Type Library to Speed Up PLC Program Design and Commissioning. Last accessed on Oct. 10, 2008, 13 pages.

European Search Report for European Application No. 09171807.2-1238 dated Feb. 4, 2008, 7 pages.

European Search Report on European Patent Application No. EP09171802.3-1238, dated Jan. 29, 2010, 6 pages.

European Search Report for European Application No. 09171806.4-1238 dated Apr. 2, 2010, 8 pages.

European Search Report dated Jan. 25, 2010 for European Application No. EP09171807, 2 pages.

European Search Report Dated Jan. 21, 2010 for European Application No. EP09171802, 2 pages.

European Search Report Dated Jan. 27, 2010 for European Application No. EP09171806, 2 pages.

OA dated May 14, 2010 for U.S. Appl. No. 11/536,715, 49 pages.

"Datastream 7i for SQL Server": Jun. 13, 2006, Infor, 2 pages.

OA dated Aug. 24, 2009 for U.S. Appl. No. 11/536,746, 18 pages.

OA dated Aug. 21, 2009 for U.S. Appl. No. 11/536,760, 17 pages.

OA dated Aug. 06, 2009 for U.S. Appl. No. 11/536,791, 38 pages.

OA dated Jun. 23, 2009 for U.S. Appl. No. 11/536,827, 22 pages.

OA dated Oct. 20, 2009 for U.S. Appl. No. 11/536,715, 41 pages.

European Search Report for European Patent Application No. EP07117140, dated May 7, 2008, 8 pages.

Sweet, et al. Managing Technology Change in Industrial Automation. Proceedings of the Third IEEE Conference on Control Applications, Aug. 24-26, 1994, pp. 3-6, vol. 1. An ABB Overview of Research Priorities.

Maaref, et al. Communication System for Industrial Automation, Proceedings of the IEEE International Symposium on Industrial Electronics, Jul. 7-11, 1997. Laboratoire Logiciels System Reseaux-Image, IEEE, pp. 1286-1291.

OA Dated Oct. 6, 2008 for U.S. Appl. No. 11/536,715, 23 pages.

OA Dated Oct. 29, 2008 for U.S. Appl. No. 11/536,746, 23 pages.

OA Dated Oct. 29, 2008 for U.S. Appl. No. 11/536,791, 43 pages.

OA Dated Oct. 7, 2008 for U.S. Appl. No. 11/536,760, 33 pages.

OA dated Sep. 17, 2010 for U.S. Appl. No. 12/241,319, 32 pages.

OA dated Mar. 22, 2011 for U.S. Appl. No. 12/241,319, 23 pages.

OA dated Feb. 24, 2011 for U.S. Appl. No. 12/241,342, 35 pages.

OA dated May 10, 2011 for U.S. Appl. No. 11/536,791, 46 pages.

* cited by examiner

DYNAMIC PROCEDURE SELECTION

TECHNICAL FIELD

The subject invention relates generally to industrial control systems and more particularly to an abstract protocol that translates higher-level requirements of a process to dynamically select and control lower level execution components that are bound at process runtime.

BACKGROUND

One type of industrial control process is referred to as a batch process, which involves subjecting raw materials to processing steps using one or more pieces of equipment to produce a "batch" of product. Efforts to automate batch processing have led to the formation of standards committees by members of industries involved in batch processing and suppliers of batch processing equipment, among others. The general purpose of these standards committees has been to define uniform standards for automated batch processing. One such standard has been promulgated by the International Society for Measurement and Control, an international organization concerned with issues of process control. This standard is entitled Batch Control Part 1: Models and Terminology and is often referred to as the ISA S88.01-1995 standard (or "S88" for purposes of this application).

The S88.01 standard defines models of equipment and procedures for use in automated batch processes, as well as terminology for use in referring to those models and their elements. The S88.01 standard defines a "batch process" as a process that leads to the production of finite quantities of material by subjecting quantities of input materials to an ordered set of processing activities over a finite period of time using one or more pieces of equipment. A "batch" is defined as the material that is being produced or has been produced by a single execution of a batch process.

Batch-processing equipment (i.e., controllable elements such as valves, heaters, mixers, and so forth) is operated according to procedures to produce a batch. Generally, such equipment is referred to synonymously as equipment, equipment modules, processing equipment, or physical elements. The procedures to operate such physical elements are often referred to by the S88.01 standard as the "procedural model." According to the S88.01 standard, the procedural model is structured as a hierarchical ranking of procedures, with the highest level encompassing each of the lower levels, the next highest level encompassing each of the levels below it, and so on. Typically, the levels of the S88.01 procedural model of a particular application are, in descending order: the "procedure;" the "unit procedure;" the "operation;" and the "phase."

The term "procedural element" generally refers to components that employ any of the levels of the S88.01 procedural model, not just to those of the "procedure" level or any other single level of the procedural model. The highest-level procedural element of interest is referred to as a procedure, which is made up of one or more unit procedures. Each unit procedure is in turn made up of one or more operations, which are each in turn made up of one or more phases. The S88.01 procedural model does not preclude definition and use of other hierarchical levels, nor does it require that each level be present in particular applications. Rather, the standard is intended to provide a broad, standardized model for describing the procedures followed in automated batch-process control.

One problem with current systems that employ models such as S88 and the like is a structured adherence to the standard leading to rigidity and inflexibility when executing a given process. Thus, when a given process is designed, respective equipment, programming for the equipment, and batch programming for operations higher up in the hierarchy are designed in a predetermined manner where it is generally known beforehand what equipment will be utilized, what processing steps will be executed, and even what programming logic will be employed. Due to the complex requirements of modern manufacturing systems including dynamic conditions that may exist from one batch to another or from one time period to another, such inflexibility does not account for the unique challenges that may present themselves as a regular occurrence in a modern automated industrial system. One option is to employ control designers to tweak procedures as conditions or requirements change but this option is generally considered an expensive solution.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A dynamically adjustable protocol is provided to enable industrial control systems to flexibly adapt to variable conditions or requirements encountered during operations while mitigating the need to manually reprogram or reconfigure such systems. A process control system responds to inputs from higher level material systems, detected conditions, process variables and the like and translates such input into higher level requirements of the system. The requirements can be communicated via one or more abstraction layers that are adapted to the control system, where the requirements can change or alter one or more components on a given layer or dynamically adjust functionality of lower layers.

Below the abstraction layers include one or more lower level execution layers that are responsive and automatically adjustable according to the requirements of the upper level abstraction layers. For instance, based on the respective requirements, one or more procedures may be dynamically selected or altered in view of the upper level requirements. By allowing procedures or other execution components to be dynamically selected or altered based on commanded or detected requirements and conditions, product quality and production levels can be controlled while mitigating the need to manually intervene when process conditions or requirements change.

In one specific example of an abstraction layer, control can be communicated via one or more segment control modules that can be further defined via one or more requirements. Respective requirements can select one or more actions that can further select one or more procedures. At each abstraction layer, components of the layer can be dynamically selected and in effect cause a different processing chain than from the previous execution path for a given batch or between batches. In this manner, processes can be automatically and dynamically altered to adjust to detected circumstances in the manufacturing process.

It is noted that although dynamic controls can be applied to batch processing and control applications in general, various high level procedures can be decomposed using different sets of lower level procedures which can be applied to other applications and industries as well. Within each industry there can be different types of procedures. For example, it is possible to dynamically assemble an electronic signature procedure (e.g., three sign-offs in a specific order, with or without comments of workers in specific roles). Given requirements of the circumstances an eSignature is being generated for, the assembly of pieces making up the procedure for the eSignature can be tailored for that situation.

Another application can include assembling instructions in order to utilize a piece of equipment. Thus, a novice user may have different requirements than an expert, so the instruction set generated for the novice can use procedure pieces that provide more verbose or illustrative explanations. Similarly, the procedure for handling a material may be different when the temperature is 90 F than when it is −10 F. In these examples, there can be a higher level definition of the procedure and the requirements of that procedure and the requirements imposed by the conditions that procedure will run can cause it to bind to different lower level components.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Systems and methods are provided to facilitate automated manufacturing processes that are dynamically adjustable according to a plurality of process conditions and variables. In one aspect, a dynamic selection component for an industrial automation system is provided. The system includes one or more abstraction layers that are executed by a batch component, the abstraction layers specify higher level requirements of a process. At least one execution layer is provided that is responsive to the abstraction layers, where the execution layer includes one or more process components that are dynamically selectable at runtime in view of the higher level requirements of the process.

It is noted that as used in this application, terms such as "component," "layer," "module," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
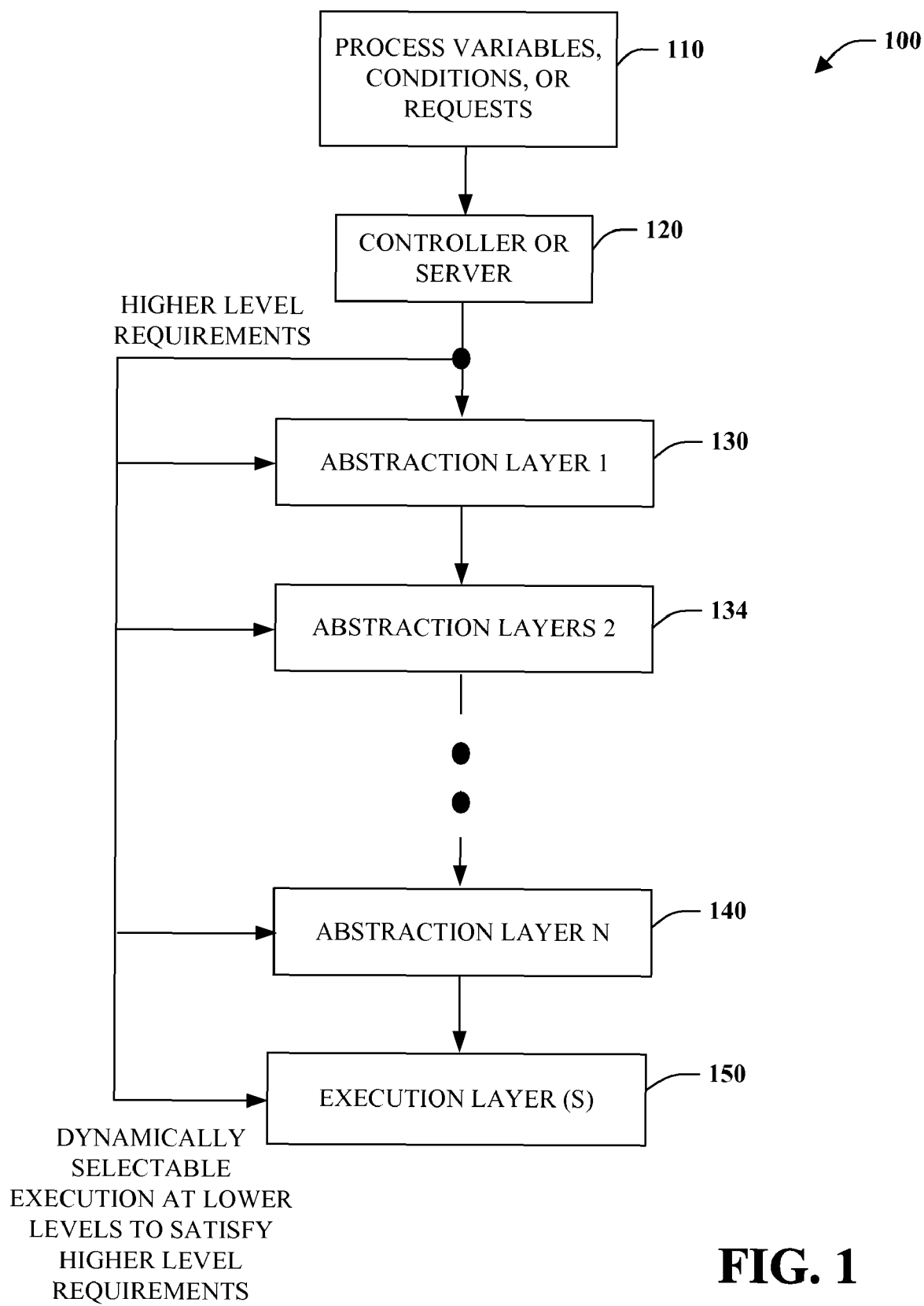
FIG. 1 is a schematic block diagram illustrating dynamic selection components for industrial automation system.

Referring initially to FIG. 1, a system 100 illustrates dynamic selection components for an industrial automation system. One or more process variables, conditions, or requests 110, (also referred to as parameters 110) are processed by a controller or server 120, where the controller dynamically selects one or more abstraction layers 130-140 in view of the parameters 110. Alternatively, the controller or server 120 can be provided as a service hosted by a controller or computer. As referred to herein, the controller 120 can refer to a lower level control component such as a programmable logic controller (PLC) or a higher-level component such as a batch server for example. Depending on the abstraction layer selected at 130 through 140, and/or the components that are employed within a given layer as will be described in more detail below, one or more execution layers 150 may be run or selected to carry out a given process for the system 100.

In general, the parameters 110 are processed according to a dynamically adjustable protocol that enables industrial control systems 100 to flexibly adapt to variable conditions or requirements encountered during operations while mitigating the need to manually reprogram or reconfigure such systems. The system 100 responds to inputs from higher level material systems, detected conditions, process variables and the like at 110 and translates such input into higher level requirements of the system that are then filtered down through the various layers 130-140 and/or 150. The requirements can be communicated via one or more abstraction layers 130-140 that are adapted to the control system 100, where the requirements can change or alter one or more components on a given layer or dynamically adjust functionality of lower layers such as lower level abstraction layers and/or the execution layers 150.

Generally, the lower level execution layers 150 are responsive and automatically adjustable according to the requirements of the upper level abstraction layers 130-140. For instance, based on the respective requirements at 110, one or more procedures may be dynamically selected or altered in view of the upper level requirements as will be described in more detail below with respect to FIG. 2. By allowing procedures or other execution components to be dynamically selected or altered based on commanded or detected requirements and conditions at 110, product quality and production levels can be controlled while mitigating the need to manually intervene when process conditions or requirements change.

The dynamically adjustable protocol described above can take on many forms. For instance, based on a given variable, condition, program request, or parameter 100, components within a given layer 130-140 may be selected according to such parameters. This can include executing different components selections based on detected changes in the parameters 110. In another example, in addition to component selections on a given abstraction layer 130-140 or execution layer 150, process variables may be passed between layers that may alter execution of components within a given layer or alter selection of components further down in the chain of layers. This can also include skipping one or more layers 130-140 or 150 of a given execution path and passing thru variables to a lower level layer to alter system execution dynamics. Thus, in some cases, changes detected by the parameters 110 may not cause changes of execution for upper abstraction layers 130 for example but may cause a change to some layer below such as abstraction layer at 140, for example. In still yet another example, there may be a combination of layers 130-140, and 150 that are dynamically selected along with dynamic selections within one or more of these respective layers.

To give but one example of how dynamic procedure selection may occur, consider automated processing of coffee beans. In the common case, an execution path for a given type of bean may be according to a Path A for a dark roasted bean and according to a Path B for a lightly roasted bean. Thus, based on a particular request detected at 110, half of all beans in an input hopper are to be applied to a Dark Roast path which is called out as a Dark Roast Segment in abstraction layer 130 and a Light Roast segment at abstraction layer 130. From these abstraction layer components at 130 calling out the upper level requirements for a given set of beans, lower level abstractions can then be selected. For example, in general, each roasting segment may refer to shaking and temperature requirements at layer 134 for example, and further refer to other actions at layer 140 before being sent to roasting ovens at 150 that process the beans to the desired roasting levels.

Following this same example of coffee roasting, a process variable 110 of moisture content may be detected in the beans that cause the course of processing actions or executions to change based on the detected variable. In this case, the change in detected moisture at 110 may not be significant enough to alter the original path for the lightly roasted beans thus the procedure may remain unchanged. For the dark roasted path however, other intermediate processing steps may be selected and executed thus causing a difference in the actual execution for the dark roasting process. In yet another example, the change in detected moisture content may be simply executed as a change in a variable condition that is passed between layers 130-140, or 150. For example, the detected change may merely be executed as causing the light roasted path to execute a given component of a layer (e.g., implemented as an action that leaves drying oven on for a different time period). As can be appreciated, dynamic procedure or variable selection can be applied to a plurality of differing types of manufacturing processes including liquids, chemicals, compounds, mixtures, gases, other solids and so forth.

In another type of example, material requirements may alter procedure selection. Thus, in a general processing path through the layers 130-140 and 150, compounds A, B, C, and D may be processed to produce a given product. However, these compounds may not always exist in the same form or be available in the same form. Process conditions may also alter how these compounds are utilized in a given process. Thus, the dynamic protocols allows for dynamic binding to a sub-recipe that would allow the ability to work with alternative materials. Depending on determined parameters or conditions at 110 relating to the compounds or available materials, one or more alternative procedures can be selected dynamically. For example, detected humidity, temperature, or pressure may cause an alternative procedure to be selected at 150. This can include dynamically queuing up or spawning procedures to actually produce ingredients that are to be later employed in the recipe or process. In this example, material B may need to first be produced from other materials before being actually being employed with materials A, C, and D (e.g., using elements E and F to form chemical reaction to produce B). Thus, a sub-recipe may be determined via the upper level requirements specified in the layers 130-140 to first produce material B before mixing with the other materials A, C, and D.

In yet another example, the use of a sweetener may be considered. If a powdered sweetener is selected, the procedure for handling it is very different than the procedure for handling a liquid sweetener. In this case, even the equipment used could be very different depending on the properties of the materials employed.

In another aspect, the system 100 can be implemented as a process control system that includes means for specifying upper level requirements of a process such as via the abstraction layers 130-140, for example. This includes means for specifying lower level execution requirements of the process (e.g., execution layers 150) and means for binding the upper level requirements to the lower level execution requirements at process runtime such as via the controller 120, for example.

Figure 2:
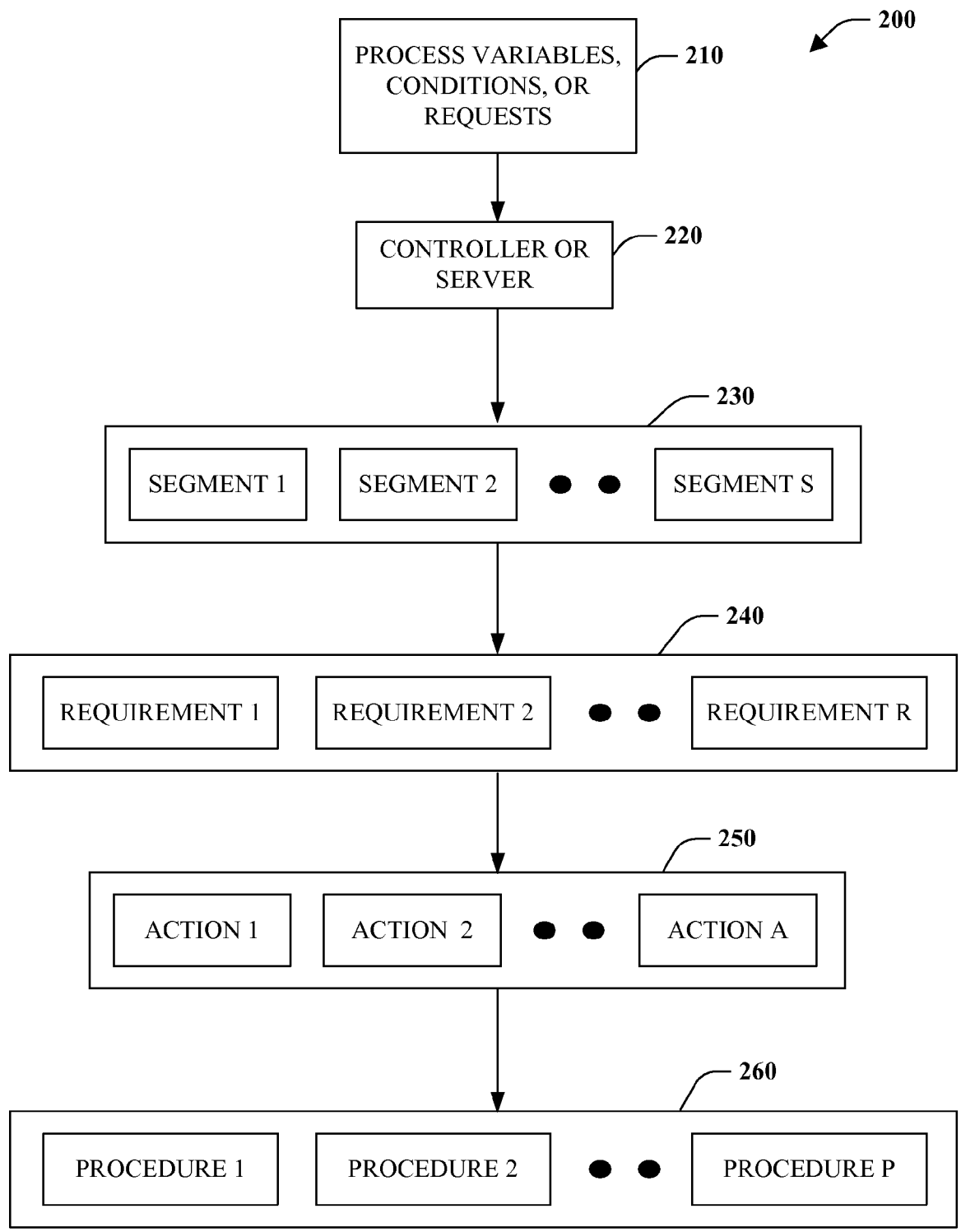
FIG. 2 is a diagram illustrating an example set of abstraction layers for an industrial automation system.

FIG. 2 illustrates an example set of abstraction layers 200 for an industrial automation system. Similar to above, one or more process variables, conditions, requests, or other parameters at 210 are processed via a controller or server shown at 220, where such controller or server can also be a service hosted by a controller or computer. In one specific example of an abstraction layer, control can be communicated via one or more segment control modules or segments 230 which can be further defined via one or more requirements illustrated at 240. Respective requirements 240 can select one or more actions 250 that can further select one or more procedures 260. As can be appreciated, more or less layers can be employed than shown at layers 230 through 260, respectively. Generally, at each abstraction layer 230-260, components of the layer can be dynamically selected and in effect cause a different (or similar) processing chain than from the previous execution path for a given batch. In this manner, processes can be automatically and dynamically altered to adjust to detected circumstances in the manufacturing process.

In one specific example, segment control modules 1 and 3 may be selected at layer 230. From these upper level segment abstractions at 230, requirements 8 through 14, and 12 through 16 may be indicated via the requirements layer 240. From these requirements at 240, actions 1, 2, 3, 6, 8, and 19-27 may be utilized at the actions layer 250. From this layer 250, procedures 25 through 42 may then be selected dynamically to implement a given process. If conditions change at 210 the next time a process is executed, execution components with in a given layer or layers may change including altering which layers of a process are required for a determined execution path. Thus in this example, if parameters change at 210, more or less segments may be selected at 230, causing more or less requirements at 240, causing more or less actions at 250, which in turn select more or less procedures at 260.

It is noted that there may be several layers of segment modules at level 230. Thus, segment modules may choose different segment modules and the resulting system of segments may be a different number of levels deep. For example, equipment and material handling instructions or procedures may contain sub-procedures and all may execute within the same level of an organizational hierarchy. This may depend on how tightly coupled the segment modules were to an organizational hierarchy. Such segment hierarchies can be flexible and have varying degrees of depth in the respective hierarchy.

Before proceeding, a general description of a module is provided that may be employed to implement one or more components in a given layer 230 through 260. Generally, the module is employed to define, interface, and execute functionality of one or more industrial control system components that are described in more detail below. The modules, such as the segment modules shown at layer 230 can be accessed across a network from the control components 220, for example. The network also allows online access to the modules and their respective control components 220 and also enables creating the modules in an offline manner such as in a computer database (not shown). When created offline, the modules can subsequently be downloaded for execution on the control components 220. Modules can be interfaced by users via standard interface methods such as via a graphical user interface (GUI) and/or can be configured to interact with a plurality of other modules or control components 220.

As will be described in more detail below, the module is an association of logic with one or more resources. The logic includes program code that can alter the state of a resource for example, ladder code, function chart, script, JAVA, C code, and so forth. The resources are those components or elements that perform an activity in a system including equipment and personnel that perform work in a system. Other examples of types of resources include Equipment, Material, Personnel, Segments and Storage. Personnel and equipment (machines) can perform activities in a system. Resources that can perform work can be classified as active resources (e.g., CNC machine, Injection molding machine), whereas other equipment resources can be considered passive resources (e.g., sensor, material). In general, the modules hide the user from internal interfaces, messages, and logic specific to the resources yet provide standard or generic interfaces to external systems or between components or layers 230-260. This allows control engineers to work with the published functionality of the module independent of how the functionality was achieved which mitigates system integration and maintenance requirements, thus reducing costs.

Modules may include other modules including nested modules where standard module behaviors and attribute patterns can be represented using common data model representations for module classes, module templates and module inheritance. Module classes and templates can be maintained in libraries which facilitate access to desired system functionality and further promote system integration. Resources can have various states associated therewith such as common S88 state classifications including idle, hold, abort, run, reset, stop, restart, and so forth where the module can present logic to represent state machines that manage the state of the resource. During application, resource modules (described below) can take on the name of the resource that is the primary focus on the module. For example, an Equipment module is primarily focused on coordination of equipment but may involve personnel in the process. Similarly, a Personnel module is focused on coordination of personnel but may involve other resources in the process. A Control Module that manages a material may be referred to as a Material Control Module and so forth.

An Instance of a modular automation component can be considered a real item in the automation system, typically viewed in an Organizational View, Geographical View, or Asset Management View. An example of an Instance is a specific named Valve in a plant (e.g., XV101), where XV101 is linked to the Valve control module template. A Bound Instance is an instance that has been assigned to one or more computing resources (e.g., controller, HMI Server) so that it can execute. A Deployed Instance is one that has been bound to its computing resources and "loaded" to make it available to execute. When deployed, the module is activated to begin executing. An Activated Instance is one that has been deployed and is actively executing on its computing resources be it standalone computers or control system resources such as programmable logic controllers.

It is noted that the components 220 can include various computer or network components such as servers, clients, programmable logic controllers (PLCs), communications modules, mobile computers, wireless components, control components and so forth which are capable of interacting across a network. Similarly, the term PLC as used herein can include functionality that can be shared across multiple components, systems, and/or networks. For example, one or more PLCs can communicate and cooperate with various network devices across the network. This can include substantially any type of control, communications module, computer, I/O device, sensor, Human Machine Interface (HMI)) that communicate via the network which includes control, automation, and/or public networks. The PLC can also communicate to and control various other devices such as Input/Output modules including Analog, Digital, Programmed/Intelligent I/O modules, other programmable controllers, communications modules, sensors, output devices, and the like.

The network can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 3:
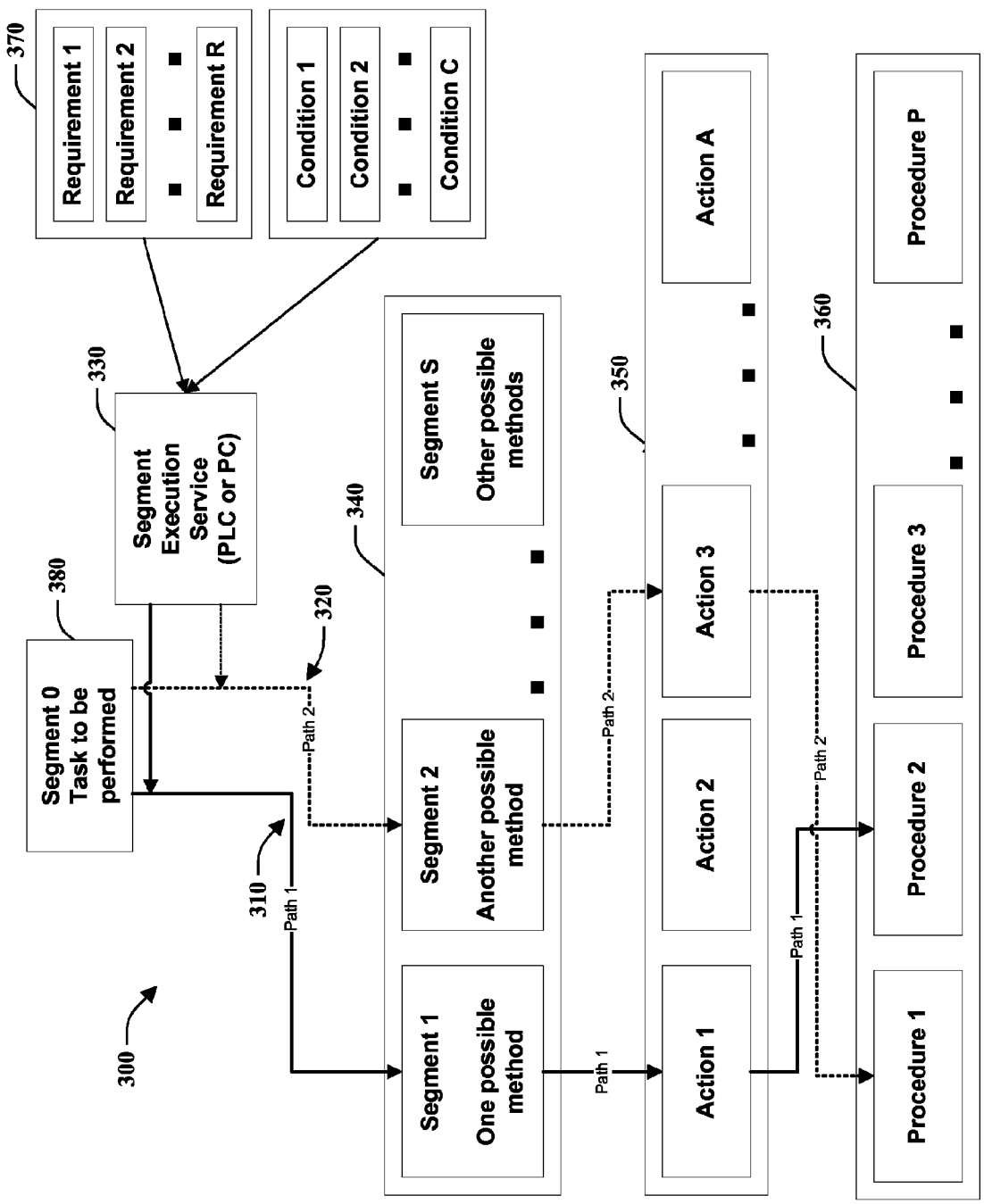
FIG. 3 is a diagram illustrating execution paths for dynamic procedure selections.

FIG. 3 illustrates example processing paths 300 for dynamic procedure selections. In this example, a path 1 at 310 and a path 2 at 320 are shown being executed through a set of layers. A segment execution service 330 selects segments 340, actions 350 and procedures 360 to be assembled based on requirements and conditions at 370 into the "path" (e.g., 310 or 320) or the final sequence. The selection can occur before a Segment 0 at 380 is run or just in time immediately prior to execution of the next step. Such execution models are described in more detail below with respect to FIG. 5. As can be appreciated, the respective layers 340 through 380 can have a plurality of segments, requirements, actions, or procedures associated with the layers. In addition, more than three layers 340-380 can be provided.

From these layer components 340-380, a plurality of execution paths can be navigated within a given layer and/or navigated between respective layers. In another example, along with dynamic selection of components within a given layer, variables can be transmitted between layers or between layer components that alters execution of a component within a layer. Thus, similar execution paths may be executed, but the dynamic protocols allow differences in execution within a given component along a given path to be executed according to the variables.

Figure 4:
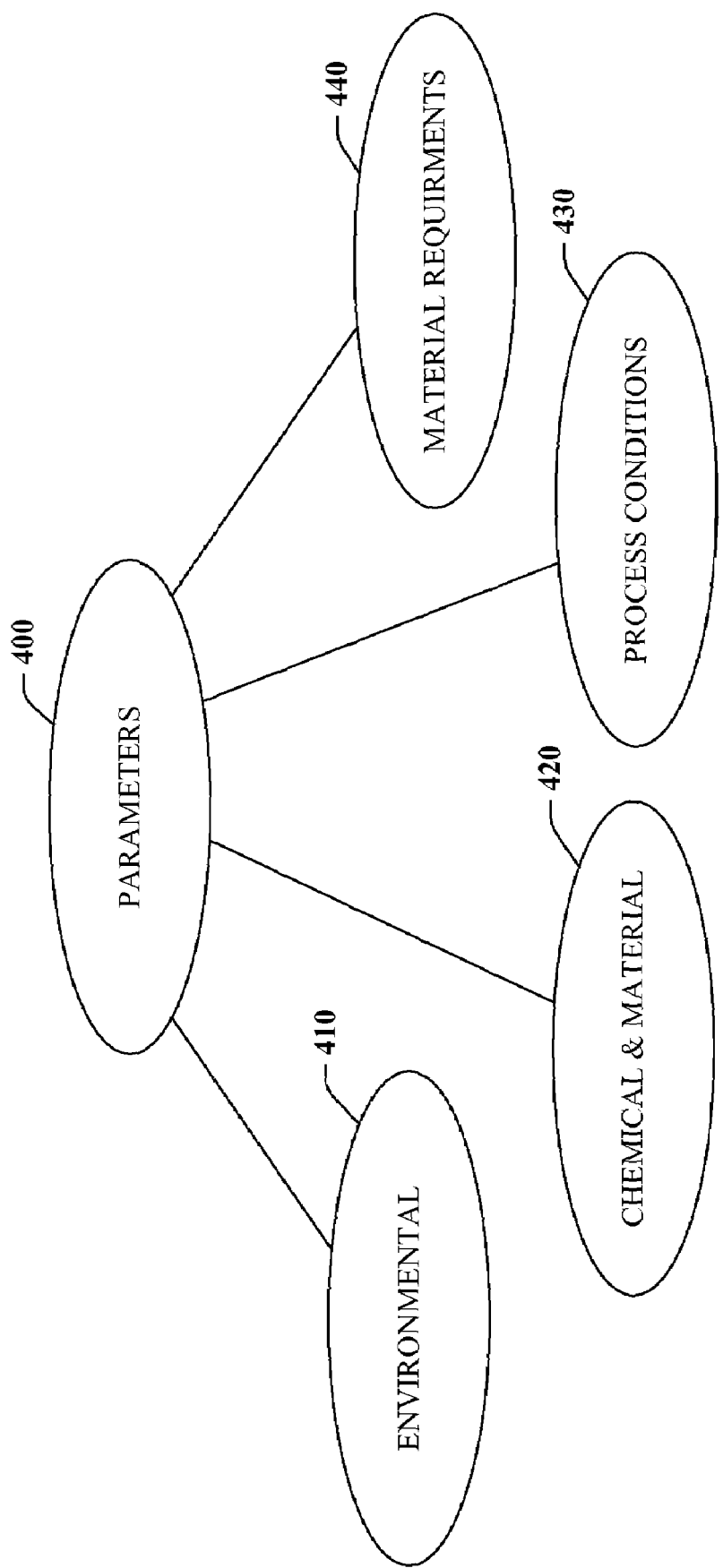
FIG. 4 is a diagram illustrating parameters that can be employed to adjust a dynamic selection process.

FIG. 4 is a diagram illustrating example parameters 400 that can be employed to adjust a dynamic selection process. One or more environmental parameters 410 may be employed to influence dynamic procedure selections. These can include temperature parameters, pressure parameters, humidity parameters, and substantially any parameter that can have an affect on a given process. Such environmental parameters 410 can be monitored and if necessary, employed to trigger alternative execution paths to account for the respective changes. At 420, chemical or material parameters can be monitored and similarly utilized to dynamically control process changes. This can include monitoring chemical or material properties of raw materials or monitoring properties during a process. If changes are detected in a given property outside of determined thresholds, dynamic components can be selected to account for the changes.

At 430, on going process conditions can be monitored and similarly accounted for via dynamic procedure selections. This can include monitoring normal wear and tear on equipment for example, and initiating process changes over time based on the detected conditions. For example, it may be determined that a flow rate has changed due to a valve not opening to a full on position. At 440, material requirements can be monitored and employed to initiate dynamic procedure selections. This can include monitoring raw goods and inventories and initiating procedures to automatically manage such goods. For example, in some cases it may be determined that a material needed for a given process is unavailable in its native form. Dynamic procedures can be initiated to search for alternative materials and process such material in an intermediate stage to satisfy material requirements for other processes.

Figure 5:
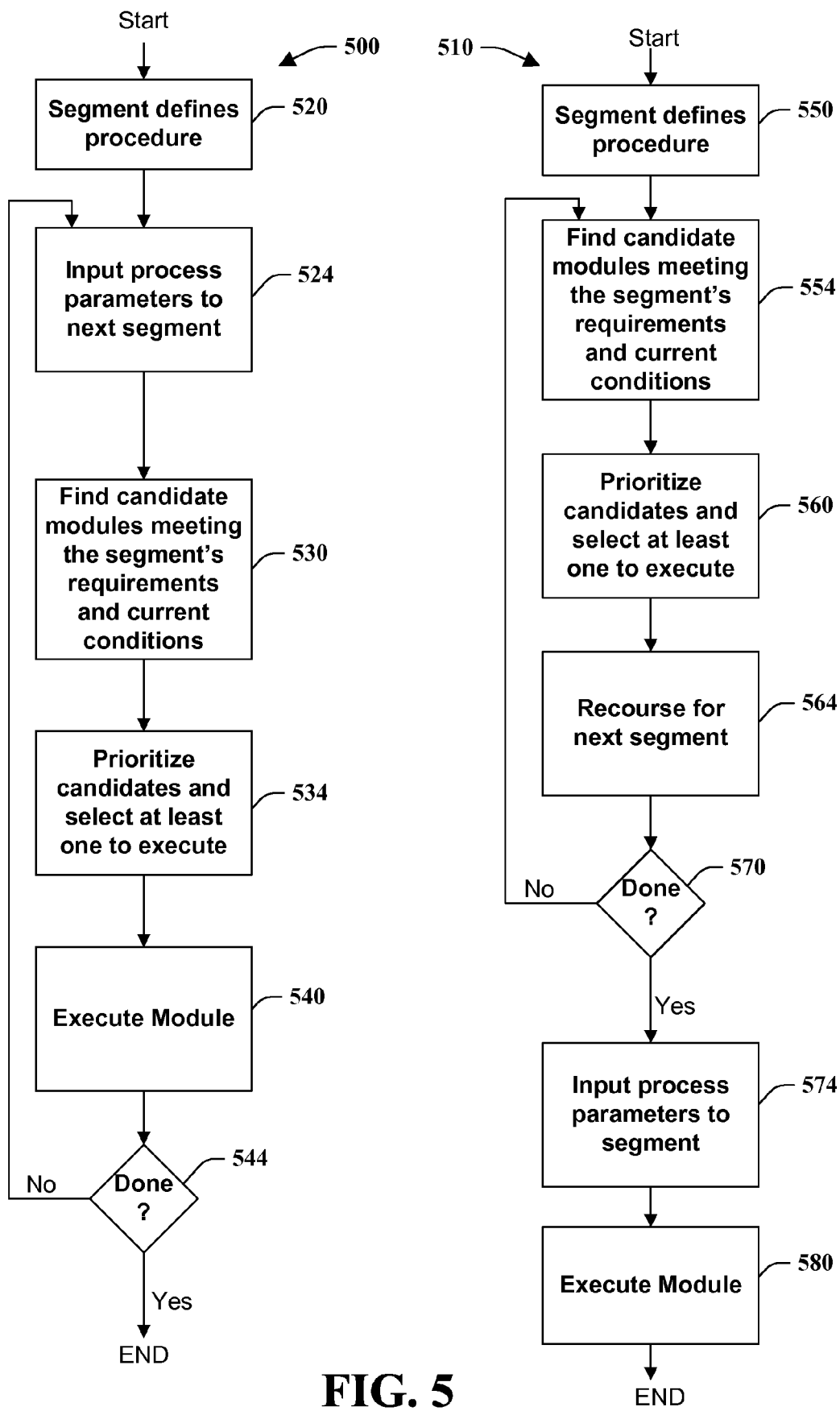
FIG. 5 is a flow diagram illustrating dynamic procedure selection processes.

FIG. 5 illustrates dynamic procedure selection processes 500 and 510 for an industrial automation system. While, for purposes of simplicity of explanation, the methodologies are shown and described as a series of acts, it is to be understood and appreciated that the methodologies are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Before proceeding, it is noted that there are various methods for executing the dynamic protocols described above. One method includes a Just in time execution model which is illustrated at 500 and a resolve procedure first model illustrated at 510. In general, a set of requirements and conditions that a segment module employs are evaluated and candidate modules are identified. One of these can be prioritized and selected for use. Then, when the next segment, action or procedure is selected to run, that module's set of requirements and conditions are evaluated and a next set of candidate modules (segments, actions or procedures) are identified and one is selected to run. This continues until the procedure required at the highest level is achieved. This set of execution procedures is the Just in Time model 500. Another example option is for current conditions and requirements to be evaluated systematically and to assemble the substantially all the components of the segment system at once and then execute as shown in the procedure illustrated at 510. These procedures can include recording a production execution path and inputs that affected the production execution path. These can also include generating multiple candidate production execution paths and selecting at least one path based on evaluation rules or interface options that are presented to an operator, for example.

Proceeding to 520 of FIG. 5, a segment is selected that defines one or more procedures. At 524, process parameters are inputted from the next segment in the process 500. At 530, search or find candidate modules meeting the segment's requirements and current conditions. This can include automated searching of a module database for example. At 534, prioritize candidate modules and select at least one module for execution, where the selected module or modules are executed at 540. At 544, a determination is made as to whether the process 500 has completed. If the process has completed at 544, the process ends. If other segments are to be executed, the process returns to 524.

Proceeding to 550 of process 510, a segment is selected that defines a procedure. At 554, search or find candidate modules meeting the segment's requirements and current conditions. At 560, prioritize candidate modules and select at least one module for execution. At 564, determine resources for next segment execution. At 570, a determination is made as to whether the process 550-564 has completed. If so, input process parameters to a segment at 574 and execute the segment or module at 580. If the process has not completed at 570, the process proceeds back to 554.

Figure 6:
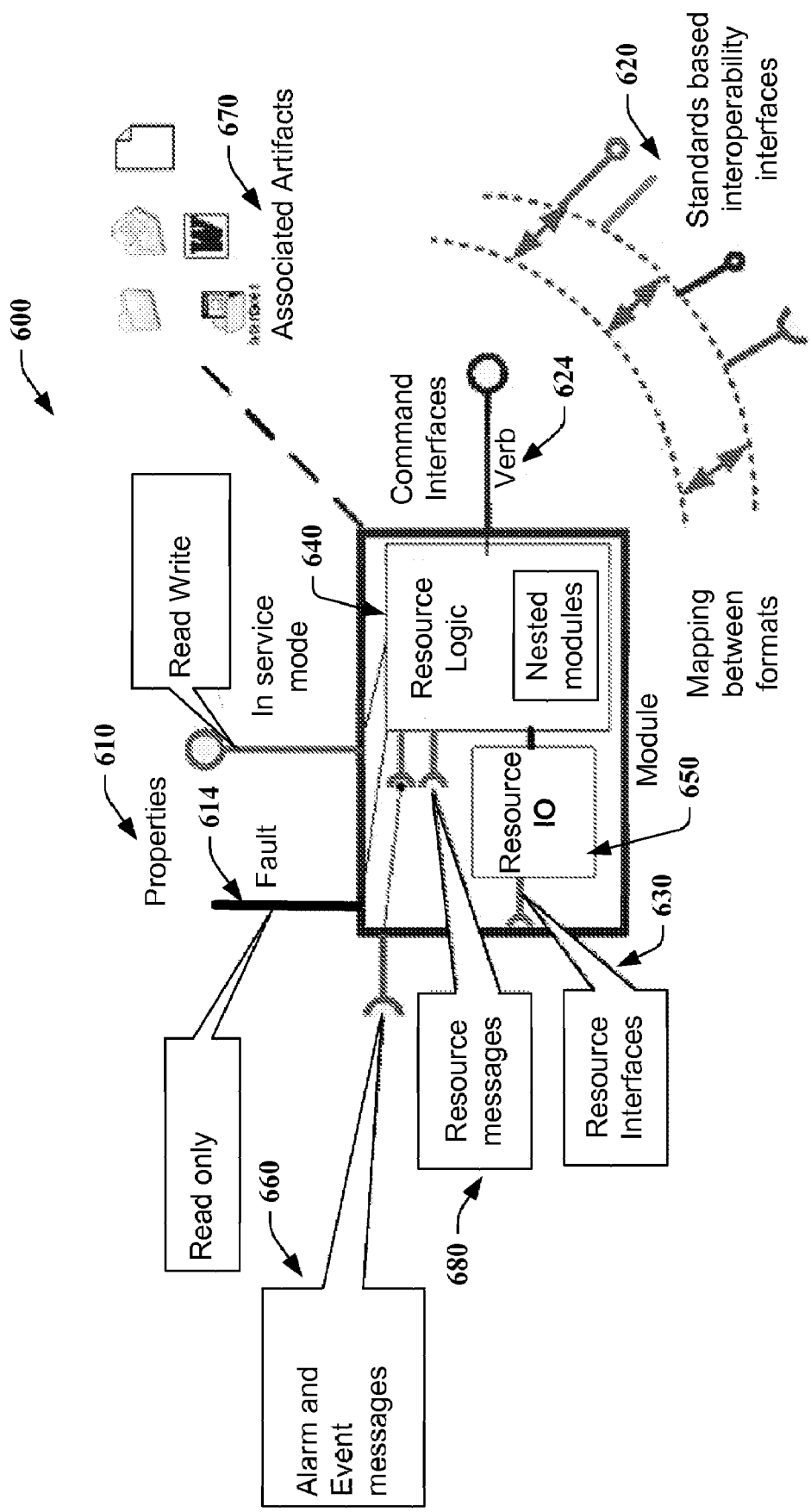
FIG. 6 is a diagram illustrating module attributes.

Referring now to FIG. 6, module attributes 600 are illustrated. The attributes 600 depicted in FIG. 6 include a common (or exemplary) representation that can be modules from modules. Generally, a set of standard attributes can be determined that are common to all modules. Similarly, for other types of modules described below, additional standard attributes can be defined. An example of a property 610 available on modules includes attributes such as Fault and Status at 614. Active resource modules (e.g., equipment and personnel) can support additional properties 610 such as available/unavailable.

Attributes presented below are represented associations from the module to objects which may be internal in a common data model (See. FIGS. 11-14) or elsewhere (e.g., CAD Files). At 620, standard public interfaces can be provided. These interfaces 620 publish verbs 624 that are available to external systems and are documented activities that hide the complexity of the underlying code used to implement the interface. Interfaces 620 can be considered into at least two common usage scenarios. For example, interfaces 620 can be used as access points that can be used to hook in real time diagnostics, security and so forth.

Public verbs 624 initiate an action within the module. The activity is described to clients of the interface 620. The implementation is considered private and is not presented to clients—for example, Open, Stop, Abort, Shut, and so forth. A data value property 610 provides public access to information that is used by the module during its operation and can be provided by request values and/or internal values (or an equivalent). The association of logic to transfer request values to internal values and vice versa are referred to as get and set logic for the value. It is noted that in a controller, if there is not a set routine to transfer request values to internal values, the internal value can overwrite the request value on the next scan providing read only capability.

In general, the properties 610 can be considered in at least two classifications. States have special significance for production systems and can have a specific set of values that can be represented by range or enumeration. A state can represent the current status of the primary resource being encapsulated by the module e.g., Percent open, Mode, Service (in, out), and so forth. Information that is used by the module during its operation includes access to data that is provided by interfaces 620. e.g., Conversion Map, Name, Description, expiry date, personnel contact information. Some properties 610 can be common to all instances of resource modules (e.g., scanned copy of resource specification documents), whereas other properties 610 are specific to each module instance (e.g., Status, percent open).

At 630, internal resource interfaces include interfaces from logic 640 in the module to the resource being managed at 650, where the logic includes code and/or configuration that processes a command and/or updates state and data properties. In some cases, this can be hardware such as I/O interfaces, or in other cases it is to subordinate resource control modules that have direct interfaces. Some examples include I/O mapping, material management logic routines, and so forth. These interfaces 630 are internal to the module enabling the modules public interfaces 620 and properties 610 to be the boundary to other system components. Modules that wrap different resources but support the same public properties/interfaces can be exchanged without disrupting interfaces to other components. Generally, I/O mapping and system messaging interfaces are exposed during deployment bind processes. When bound, external interfaces 620 to runtime systems may then consider these interfaces as internal.

At 660, alarm and event messages can be provided which include messages that exposed as runtime messages visible to external systems during the execution of the module. This includes alarms and events explicitly coded by the developer and system messages promoted to be visible by external systems. At 670, one or more artifacts include information that document the operation and structure of the resource such as for example, wiring diagrams, warranties, payroll, parts supplier information, and so forth. Visualization aspects include associated graphics that present the resource state and properties to applications interacting with the resource. For example: faceplates, icons, state overlays, edit dialogs, help files. At 680, system messages allow modules to listen for and publish data model messages to external components. Inbound messages are typically used to manage modules (configure, initialize, propagate properties, and so forth) and publish messages on module activity (resource state, data model messages, and so forth).

Figure 7:
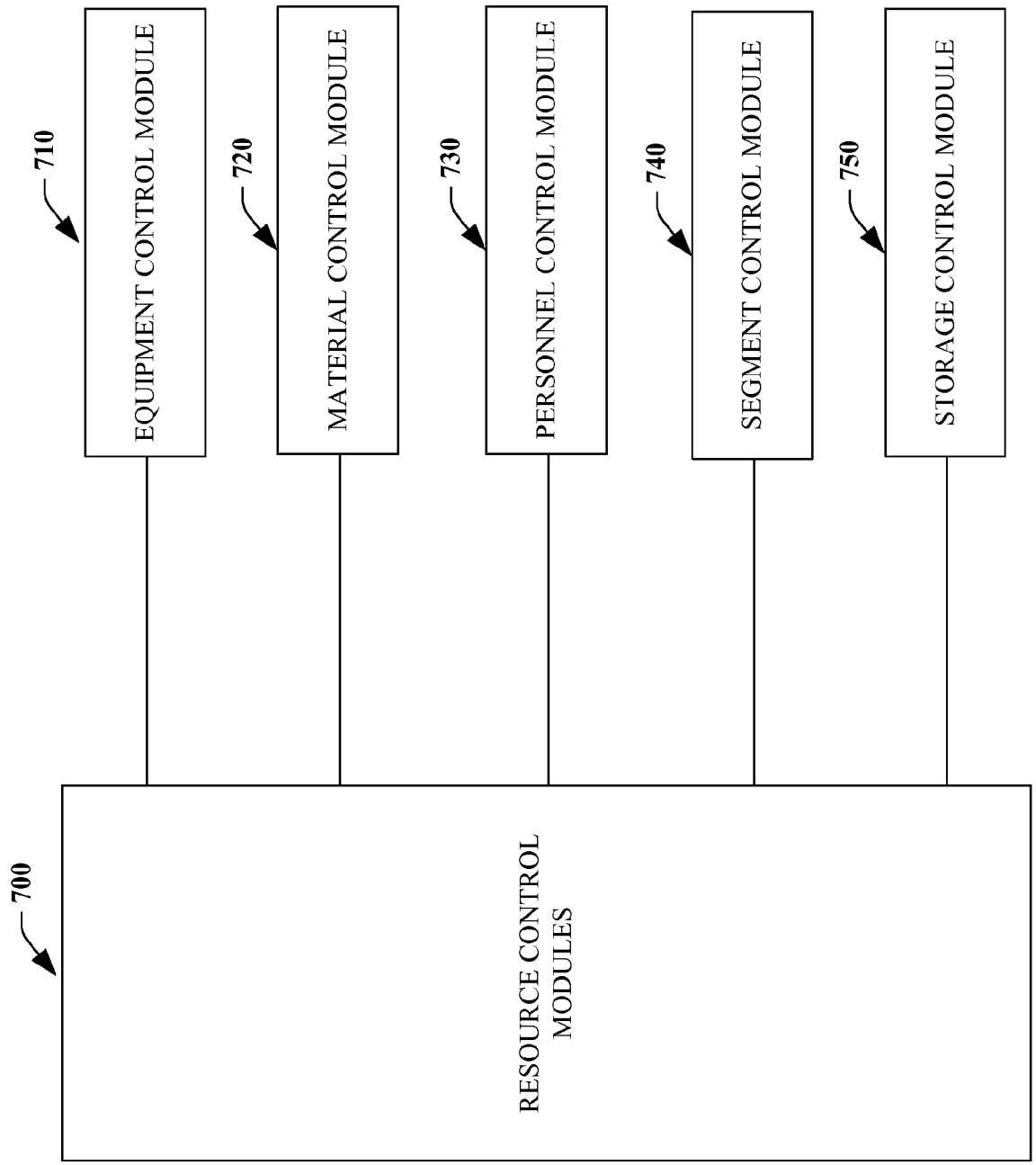
FIG. 7 is a diagram illustrating example resource control modules.

Turning to FIG. 7, example resource control modules 700 are illustrated. In general, resource control modules 700 provide simple control of one or more resources. The resource control module (RCM) 700 represents the logic to manage the state or data of the resource and may contain other resource control modules to achieve its respective functionality. The RCM 700 provides public interfaces via actions and properties. In some cases, an action may be a simple bit value or a request value that is interfaced to internal values in the module and in other cases more complex logic can be provided. The RCM 700 can include other resource control modules and may promote a command to be represented as segment resource control interface. Example forms of the RCM 700 include:

At 710, an Equipment Control Module (Common name="Control Module") CM. The simplest form of basic regulatory control of equipment. Encapsulating the equipment and its control such as control of values, drives, and so forth. At 720, a Material Control Module (MCM) can be provided. Management of Material resource instances which are represented as sub-lots including change in location, quality status, availability, order status, logic that can be performed on material sub-lots, generation of material events such as consumed, produced and moved events, sub-lot combination, expiry dates, and so forth.

At 730, a Personnel Control Module (PCM) is provided. This includes management of individual people such as Active, Idle, Break states directly or via shift schedules. This also includes data associated with people such as shift time patterns, for example. Other attributes that may be managed by PCM 730 are a person's location in a plant (GPS), qualification checks, or current assignment, for example. At 740, a Segment Control Module (SCM) includes manipulation of simple segment tasks such as piping paths, AGV paths, device state machines, robotic sequences and so forth. The SCM 740 typically performs an action on one segment such as next step to execute after the current step. At 750, a Storage Control Module (STGCM) includes Manipulation of simple storage logic such as buffer capacity and ordering into and out of a queue for the respective storage unit or requirement.

Figure 8:
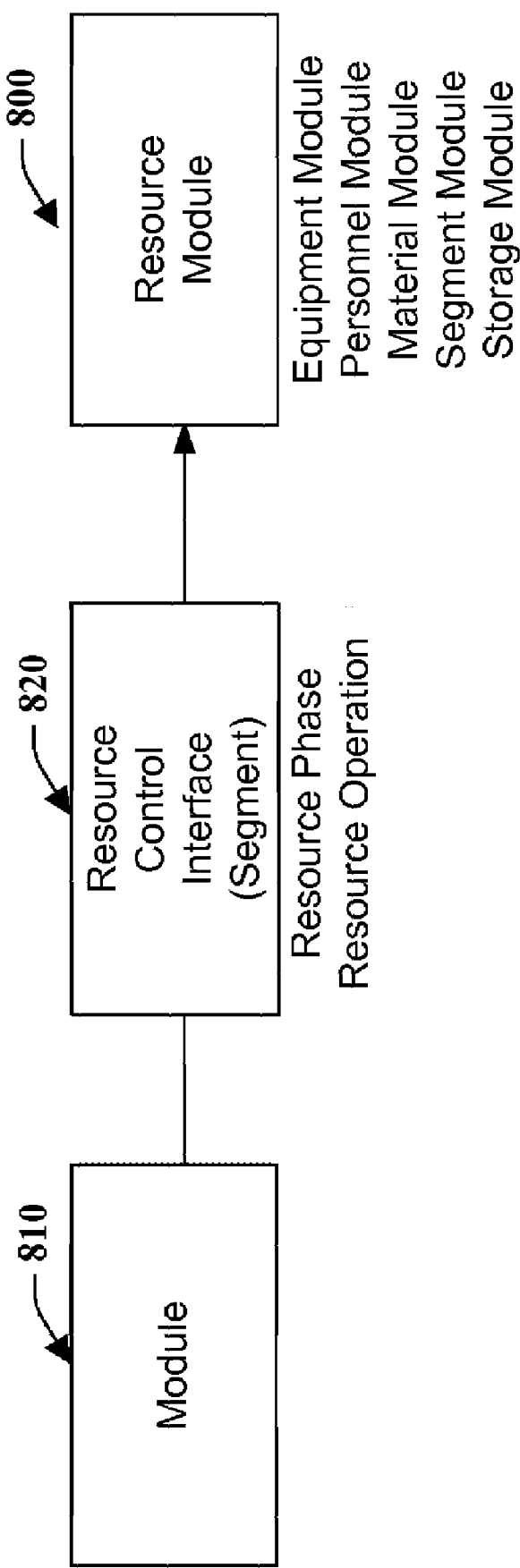
FIG. 8 is a diagram illustrating a resource module.

FIG. 8 illustrates a resource module 800 for an industrial control system. Resource modules 800 extend resource control modules described above to enable coordination of resources (equipment, people, modules and so forth) to achieve. As shown, the resource control module 800 includes a module 810 and a resource control interface 820. Resource modules 800 are also able to represent more complex activities than resource control modules. For example, resource modules may include other resource control modules at 810 and/or other resource modules. For example, an equipment module may leverage a subordinate material control module to represent material handling aspects or a segment module to solicit an electronic signature.

Before proceeding it is noted that other types of modules are possible than shown. For instance, a configuration module may include management definitions and configuration of resources—personnel, segments, equipment, segments, storage, and so forth. Another type of module includes nested modules where a module references other modules. These modules may be children of a parent module or shared from one module to another. Resource modules may include resource control modules however resource control modules should not include resource modules. Modules can include modules focused on other resource types, for example an equipment module may include equipment modules and material modules.

Figure 9:
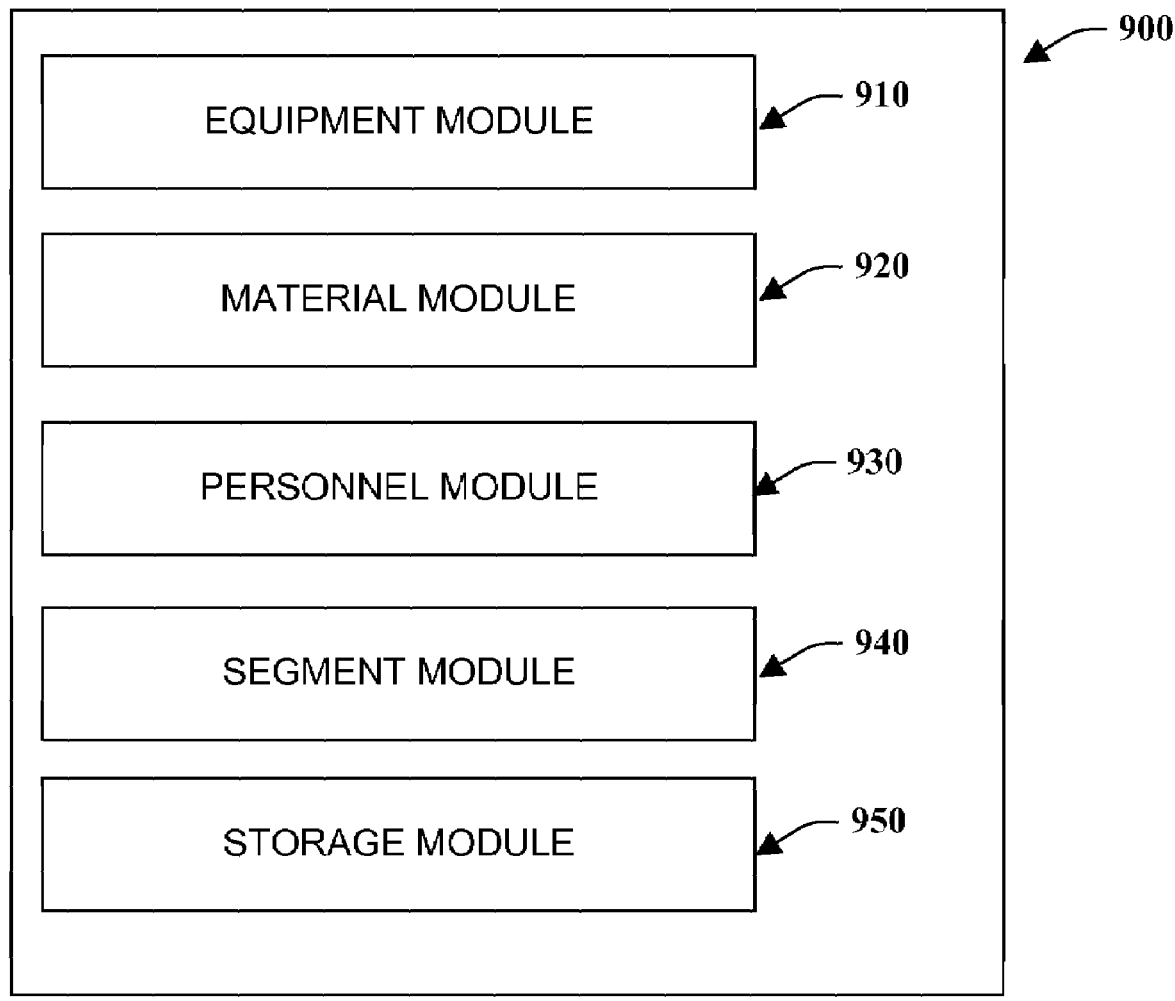
FIG. 9 is a diagram illustrating example resource modules.

FIG. 9 illustrates example resource modules 900 for an industrial control system. At 910, an Equipment Module provides coordination of equipment modules and equipment control modules to perform a process-orientated task independent of specific material e.g., In-feed, AGV controller, Conveyor, and so forth. At 920, a Material Module provides coordination of material modules and material control modules to perform material focused tasks e.g., Material reservation, provision, material mass balance calculation, Bill of Material management, Work order management, and so forth. At 930, a Personnel Module provides coordination of personnel modules and personnel control modules to perform personnel focused tasks e.g., Electronic signature collection, Security validation, certification validation, Manual control interactions, and so forth.

At 940, a Segment Module provides coordination of segment modules and segment control modules and to execute sequences of tasks represented by segments. Segments define resource requirements and ordering that can represent most production and process activities. This module provides access to more complex tasks that require specific sequences to be followed e.g., Process Analytics Technology (PAT) integration, electronic signatures collection, defect, process deviation and fault recovery processing. The segment module 940 may also construct a sequence to be followed that can be applied as manual, automatic or semi automatic sequences (e.g., Route, recipe execution) At 950, a Storage Module provides coordination of storage related activities, allocation of storage to requestors, modeling of inventory calculations and so forth. This also includes interaction with higher-level systems that manage storage and inventory information.

Figure 10:
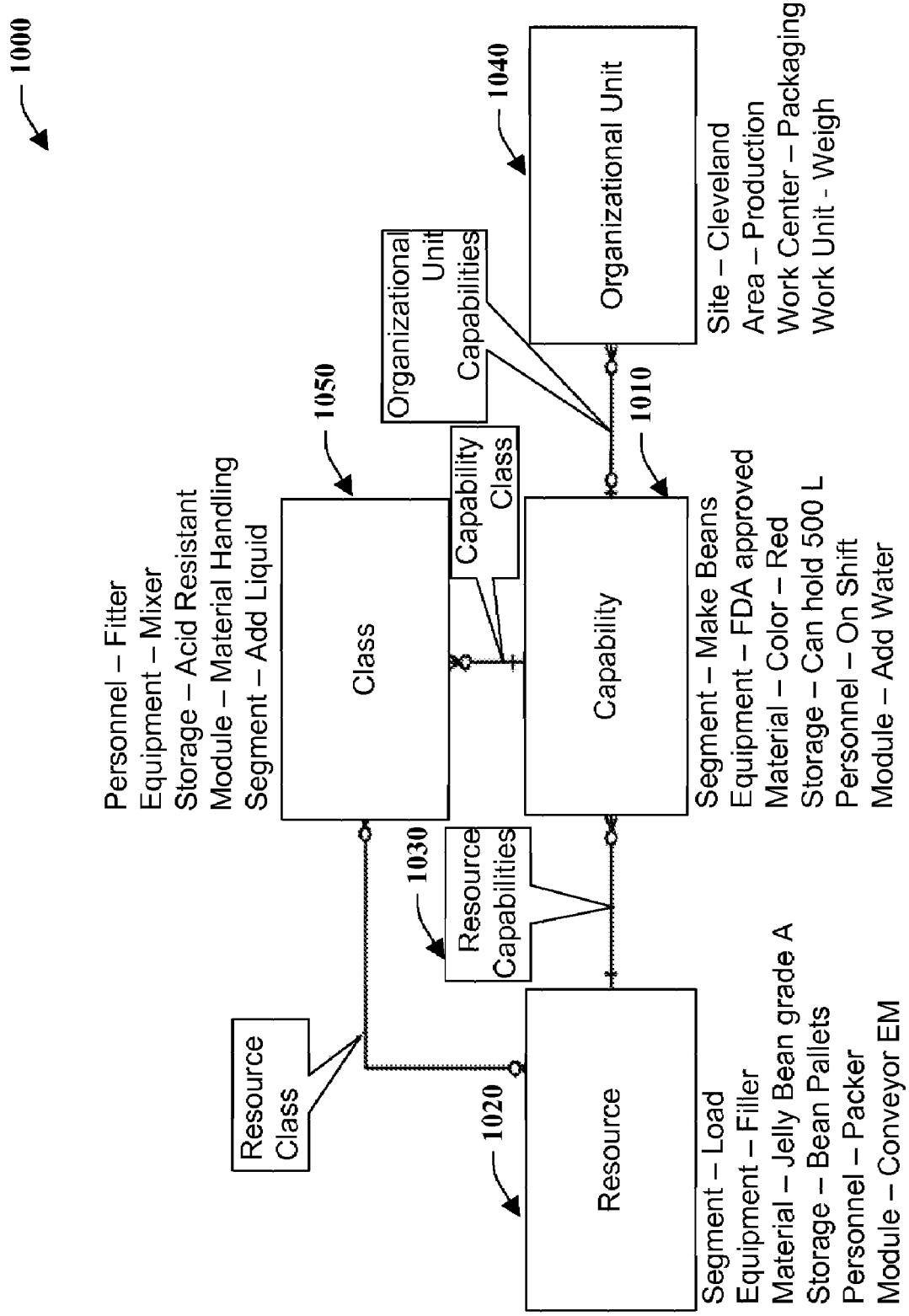
FIG. 10 is a diagram illustrating a resource control model.
Figure 11:
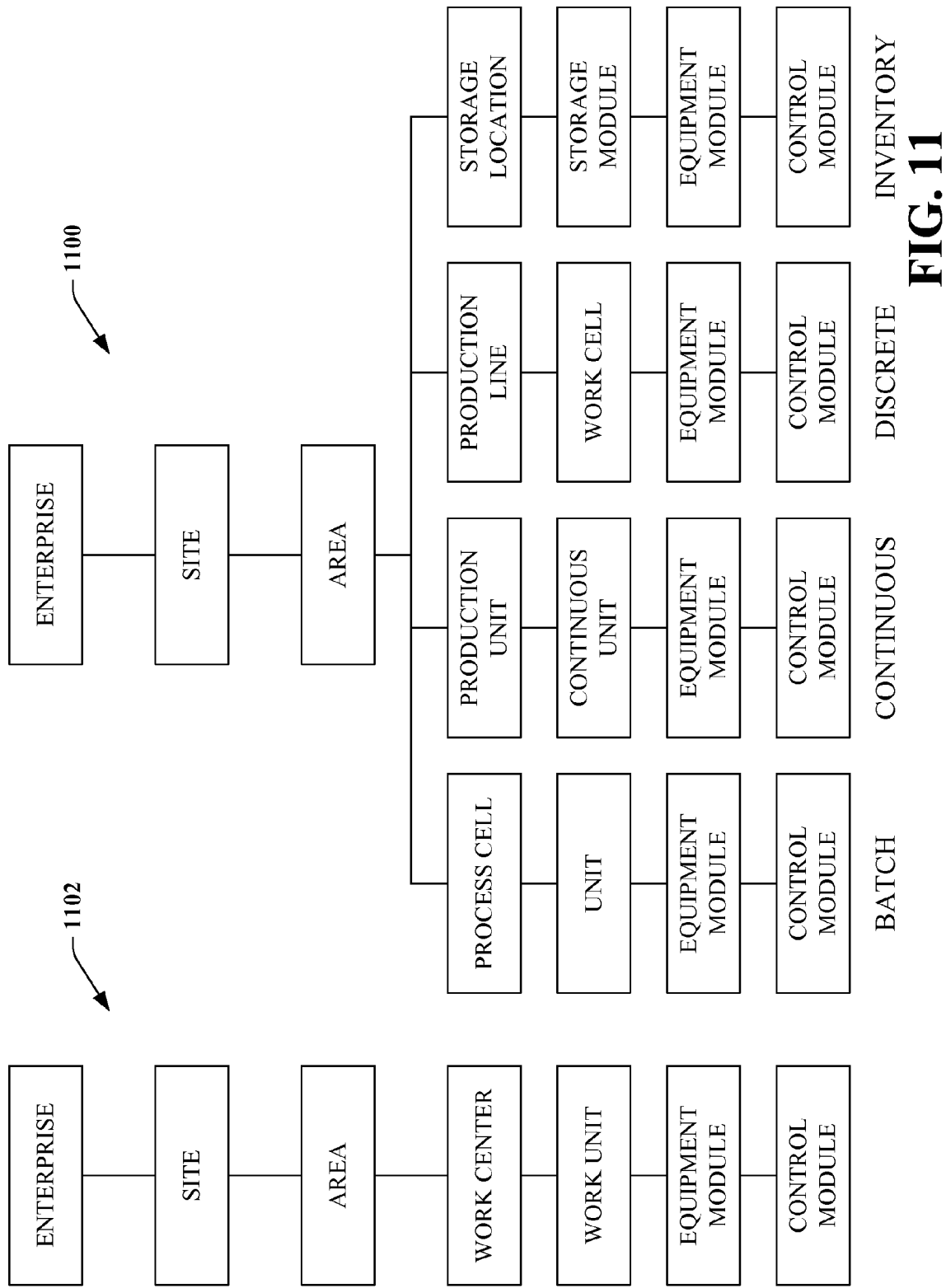
FIGS. 11-14 illustrate a common data model that can be employed with modules in an industrial automation system.

FIG. 10 illustrates an example resource control model 1000 for an industrial control system. Resource Control Interfaces are the interfaces exposed to production management systems for resource binding and arbitration purposes. The interfaces are elements of the resource control model 1000 including procedures, operations or phases. These interfaces are made available by exposure via one or more capabilities 1010 described below. Procedures, operations and phases depicted in this model 1000 are commonly referred to in association with their module resource type such as Equipment Phase, Personnel Phase, Segment Phase, or as a generic Resource Phase where no specific resource module is required. Production management including Product Production Rules (production route or control recipe) physically bind to (reference) resource control phases to perform work. The availability of other resources 1020 such as material, equipment, personnel are considered during the binding process of product production rules to work centers (production lines, process cells, and so forth). These selection processes evaluate resource capabilities to locate the appropriate resource for the task.

Resource capabilities 1010 include the resource 1020 required to perform work in a production system. Consequently, resources 1020 are at the centre of, efficiency, capacity, scheduling and arbitration considerations. A resource's ability to work or be available to allow work to commence is represented as resource capability at 1030. The existence of capability 1030 associated with a resource 1020 does not make the resource available for production; the resource's capability 1030 is associated with organizational units 1040 that are will support the respective resource capability. For example, an operator (personnel resource) may have qualifications for a Mixer in line 1, where this qualification capability is only in effect with that specific mixer unless explicitly directed. Resource arbitration algorithms can search for resource capabilities 1030 in the scope of organizational units 1040 they are to be executed within.

Resources 1020 publish capabilities to organizational units 1040 for use by system processes in a given scope. Modules are a type of resource and can be accessed directly by published capabilities 1010. However, a more common interface to Resource Modules is via verbs that are supported by the Resource Module noted above. These verbs are Resource Control elements (phases, operations, procedures . . . ) which are segments. A published capability of a resource module is typically one of the phases supported the module. Resource control interfaces are published (made available) to the outside world as capabilities 1010. Resource modules provide the ability to promote a command to become a resource control interface.

Some process control systems are built using only Resource control modules (especially control modules). Examples of this are continuous processes such as petrochemical and heavy chemical plants. In order to initiate, the process takes a plant up to its running state or makes a change to the state of a series of commands that are initiated and coordinated to achieve the new state. It is also possible to promote commands from resource control modules to appear as capabilities that can be accessed as "tuning knobs" for tweaking the system between system states. As shown in the model 1000, the resource 1020 and capability can be associated with a higher-level class or abstraction 1050.

FIGS. 11-14 illustrate aspects of a common data model noted above. Now turning to FIG. 11, hierarchical representations that can be employed in connection with a schema employed by programmable logic controllers to facilitate use of a hierarchically structured data model are illustrated. The hierarchies illustrated in this figure relate to equipment hierarchies, which can be integrated with procedure hierarchies to generate a robust representation of a plant (which is incorporated within a schema for use in connection with industrial controllers). A first hierarchy 1100 illustrates a representation of equipment within a plant given disparate processes. For instance, a hierarchy in accordance with a batch process can include a representation of an enterprise, site, area, process cell, unit, equipment module, and control module. In contrast, a hierarchical representation of equipment within a continuous process can include representations of an enterprise, site, area, production unit, continuous unit, equipment module, and control module. In still more detail, an enterprise can represent an entirety of a company, a site can represent a particular plant, an area can represent a portion of the plant, a process cell can include equipment utilized to complete a process, a unit can relate to a unit of machinery within the process cell, an equipment module can include a logical representation of portions of the process cell, and the control module can include basic elements, such as motors, valves, and the like. Furthermore, equipment modules can include equipment modules and control modules can include control modules. Thus, as can be discerned from the figure, four disparate hierarchical representations can be employed to represent equipment within batch processes, continuous processes, discrete processes, and inventory.

A second hierarchy 1102 can be utilized that represents each of the aforementioned hierarchical representations. The hierarchy 1102 can include representations of an enterprise, a site, an area, a work center, a work unit, an equipment module, and a control module. Thus, a common representation can be generated that adequately represents the hierarchy 1100. For purposes of consistent terminology, data objects can be associated with metadata indicating which type of process they are associated with. Therefore, data objects can be provided to an operator in a form that is consistent with normal usage within such process. For example, batch operators can utilize different terminology than a continuous process operator (as shown by the hierarchy 1100). Metadata can be employed to enable display of such data in accordance with known, conventional usage of such data. Thus, implementation of a schema in accordance with the hierarchy 1102 will be seamless to operators. Furthermore, in another example, only a portion of such representation can be utilized in a schema that is utilized by a controller. For instance, it may be desirable to house equipment modules and control modules within a controller. In another example, it may be desirable to include data objects representative of work centers and work units within a controller (but not equipment modules or control modules). The claimed subject matter is intended to encompass all such deviations of utilizing the hierarchy 1102 (or similar hierarchy) within a controller.

Figure 12:
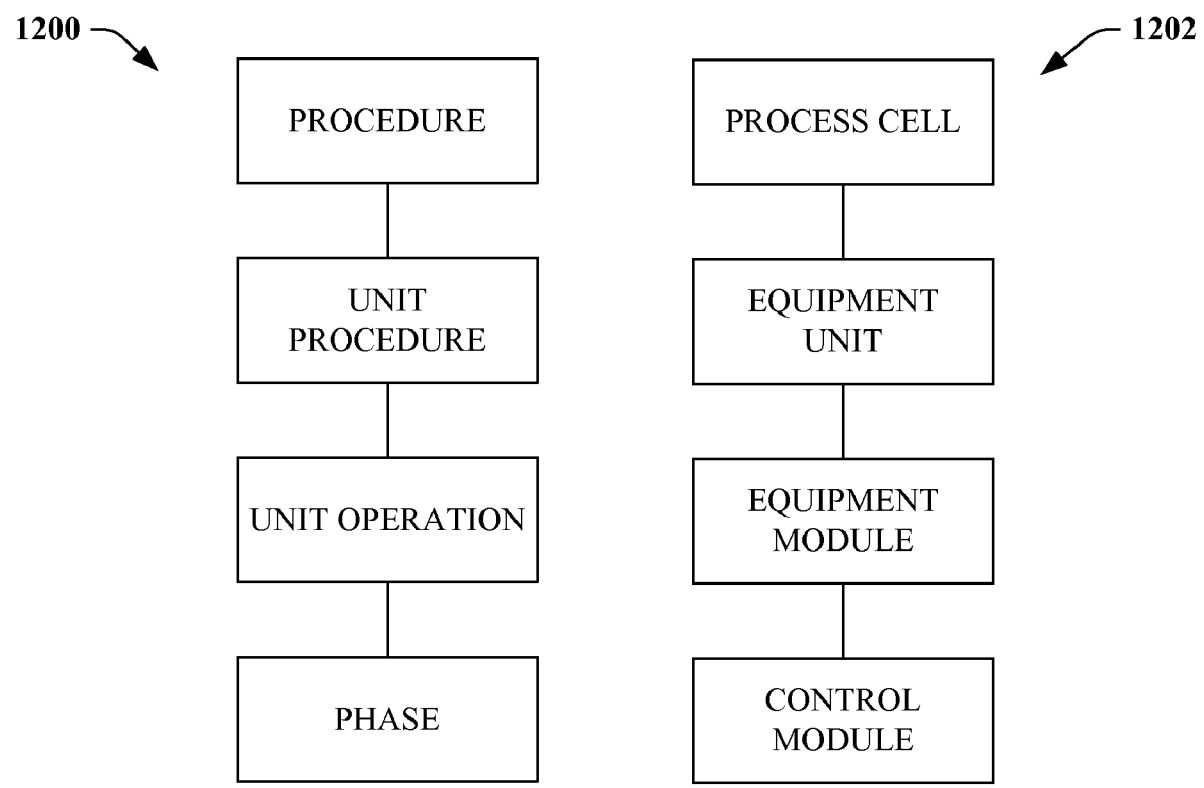

Referring to FIG. 12, standard hierarchies that can be utilized to represent procedures and equipment are illustrated. In particular, a hierarchy 1200 represents procedures that can exist within a batch process. For instance, a procedure can relate to a high-level procedure, such as creation of a pharmaceutical drug. A unit procedure can be more specific, such as adding particular chemicals to a mix by way of a particular unit. A unit operation can be still more specific, and a phase can be yet more specific (relating to operation of low-level machines). For instance, a phase can relate to various states which can exist with respect to low-level equipment, such as stopping, starting, pausing a motor, opening and closing a valve, and the like. A hierarchy 1202 relating to a representation of equipment in, for example, a batch process is displayed adjacent to the hierarchy 1200.

Figure 13:
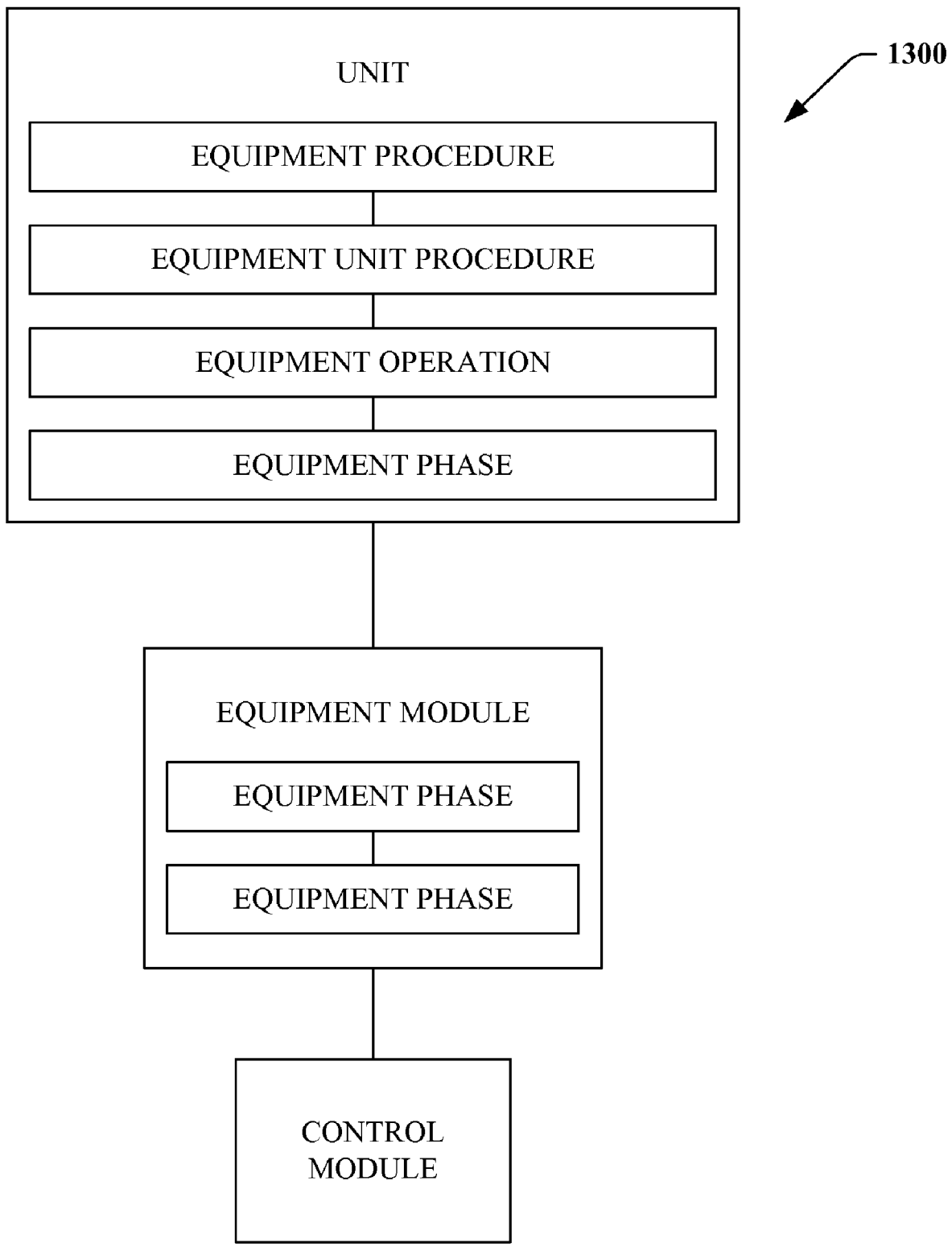
Figure 14:
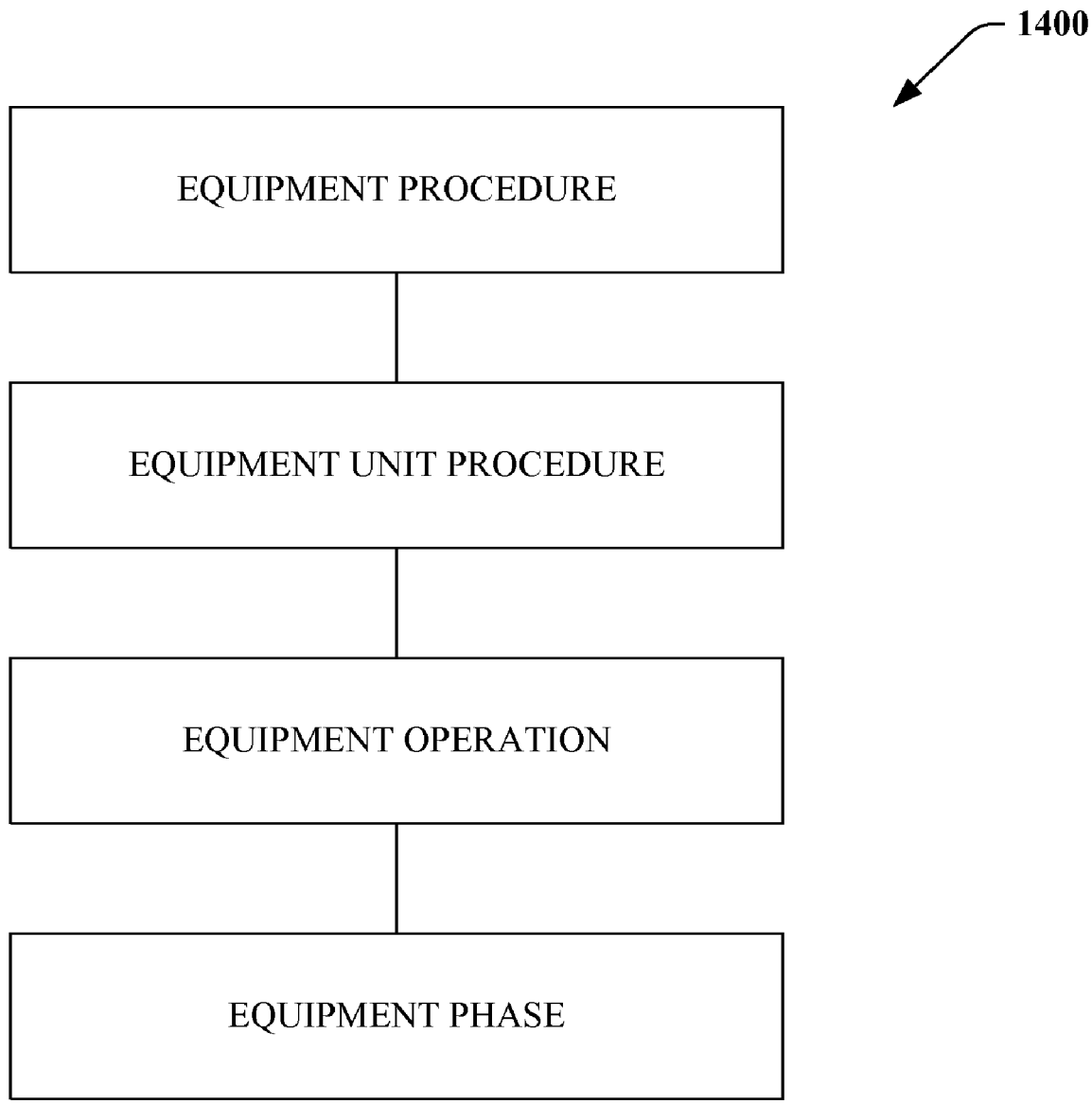

Turning to FIG. 13, a hierarchy 1300 that represents one possible integration of the example hierarchies 1200 and 1202 (FIG. 12). A unit (such as a work unit described in FIG. 14) can be associated with an equipment procedure, an equipment unit procedure, an equipment operation, and an equipment phase). Thus, the procedures, operation, and phase can be associated with a particular work unit. An equipment module can be associated with one or more equipment phases, and can be above a control module in the hierarchy. Referring Briefly to FIG. 14, a hierarchy 1400 that can be utilized in connection with equipment control is illustrated. The hierarchy is substantially similar to that described within the unit portion of the equipment unit. As stated above, the hierarchies illustrated in FIGS. 11-14 can be based upon a standard, such as ISA 88, ISA 95, or other standard. Any suitable representation that can be utilized to model an entirety of a plant, however, is contemplated. Further, the representations shown in these figures can be directly implemented into a controller. For instance, data objects in accordance with any portion of the hierarchies described in FIGS. 11-14 can be existent within a controller, together with state machines that enable creation of such objects.

It is noted that the above modules can be processed on various types of computing devices and resources, where some of these devices may be associated with an industrial control component, embedded computer, PLC, and other devices associated with standalone or networked computing devices. Thus, computers can be provided to execute the above modules or associated data that include a processing unit, a system memory, and a system bus, for example. The system bus couples system components including, but not limited to, the system memory to the processing unit that can be any of various available processors. Dual microprocessors and other multiprocessor architectures also can be employed as the processing unit.

It is to be appreciated that software components can be provided that act as an intermediary between users and the basic computer resources described in suitable operating environment. Such software includes an operating system which can be stored on disk storage, acts to control and allocate resources of the computer system. System applications take advantage of the management of resources by operating system through program modules and program data stored either in system memory or on disk storage. It is to be appreciated that the claimed subject matter can be implemented with various operating systems or combinations of operating systems or shared with control systems.

Computers or controllers can operate in a networked environment using logical connections to one or more remote computers. The remote computer(s) can be a personal computer, a server, a router, a network PC, a workstation, a microprocessor based appliance, a peer device or other common network node and the like, and typically includes many or all of the elements described relative to computer. Remote computers can be logically connected through a network interface and then physically connected via communication connection. Network interfaces encompass communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL), and wireless networks.

The systems described above employing the authentication protocols can include one or more client(s). The client(s) can be hardware and/or software (e.g., threads, processes, computing/control devices). The systems can also include one or more server(s). The server(s) can also be hardware and/or software (e.g., threads, processes, computing/control devices). The servers can house threads to perform transformations by employing the authentication protocol, for example. One possible communication between a client and a server may be in the form of a data packet adapted to be transmitted between two or more computer processes.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus for an industrial automation system, comprising:
   an interface configured to receive one or more parameters for a control process in the industrial automation system;
   a memory configured to store a dynamic selection component, wherein the dynamic selection component comprises:
   one or more abstraction layers that specify higher level requirements of the process based at least in part on the one or more parameters, wherein the one or more abstraction layers comprise one or more modules; and
   at least one execution layer, comprising one or more process components that carry out the control process based at least in part upon the higher level requirements, wherein the at least one execution layer comprises at least one module; and
   at least one processor configured to translate the one or more parameters into the higher level requirements, communicate the higher level requirements to the at least one execution layer via the one or more abstraction layers, and execute the at least one execution layer based at least in part upon the higher level requirements.

2. The apparatus of claim 1, wherein the one or more parameters include one or more process variables, one or more process conditions, one or more process requests, one or more process parameters, or one or more process requirements.

3. The apparatus of claim 1, wherein the apparatus is at least one production management computer, at least one batch server or at least one programmable logic controller.

4. The apparatus of claim 1, wherein the apparatus is configured to employ a communications protocol to communicate between the one or more abstraction layers and the at least one execution layer.

5. The apparatus of claim 1, wherein the one or more parameters relate to an execution path.

6. The apparatus of claim 5, wherein at least one processor is further configured to determine the execution path based at least in part on one or more control components associated with the one or more abstraction layers and the at least one execution layer.

7. The apparatus of claim 1, wherein the one or more parameters include at least one of an environmental parameter, a chemical parameter, a material parameter, or a material requirement parameter.

8. The apparatus of claim 7, wherein the material requirement parameter is employed to initiate a sub-procedure to produce a material that is employed in a subsequent mixture.

9. The apparatus of claim 1, wherein the at least one execution layer includes a procedure layer.

10. The apparatus of claim 1, wherein the one or more modules associated with the one or more abstraction layers and the at least one module associated with the at least one execution layer are associated with resources within the industrial automation system.

11. The apparatus of claim 1, wherein the one or more modules associated with the one or more abstraction layers and the at least one module associated with the at least one execution layer include at least one nested module.

12. The apparatus of claim 1, wherein the one or more modules associated with the one or more abstraction layers includes at least one segment module.

13. The apparatus of claim 1, wherein at least one of the one or more modules associated with the one or more abstraction layers or the at least one module associated with the at least one execution layer is an activated instance that executes on the apparatus.

14. The apparatus of claim 1, wherein the one or more modules associated with the one or more abstraction layers and the at least one module associated with the at least one execution layer include one or more attributes defined according to a common data model.

15. The apparatus of claim 1, wherein the one or more modules associated with the one or more abstraction layers and the at least one module associated with the at least one execution layer include at least one command interface that includes input/output (I/O) mapping and material management logic routines.

16. The apparatus of claim 1, wherein the one or more modules associated with the one or more abstraction layers and the at least one module associated with the at least one execution layer communicate via one or more system messages.

17. The apparatus of claim 1, wherein the processor is further configured to communicate the higher level requirements to the at least one execution layer via one or more modules associated with the one or more abstraction layers, and execute at least one module associated with the at least one execution layer based at least in part upon the higher level requirements.

18. The apparatus of claim 11, wherein the nested module is based at least in part on an organizational hierarchy.

19. The apparatus of claim 1, wherein the at least one abstraction layer comprises at least one requirements layer and at least one actions layer.

20. A method, comprising:
receiving one or more parameters for a control process in an industrial automation system at a hardware industrial controller;
dynamically selecting one or more abstraction layers that are adapted to the control process based at least in part on the one or more parameters;
translating the one or more parameters into one or more higher level requirements within the one or more abstraction layers;
dynamically adjusting at least one functionality of at least one lower level control procedure for the control process based at least in part on the one or more higher level requirements; and
executing the at least one control procedure for the control process on the hardware industrial controller.

21. The method of claim 20, further comprising defining one or more modules to perform at least one of the one or more abstract layers or the at least one control procedure.

22. The method of claim 20, wherein the one or more parameters include at least one of an environmental parameter, a chemical parameter, a material parameter, or a material requirement parameter.

23. The method of claim 20, further comprising recording a production execution path and inputs affecting the production execution path.

24. The method of claim 20, further comprising generating multiple candidate production execution paths and selecting at least one of the multiple candidate production execution paths based on evaluation rules or options that are presented to an operator.

25. An industrial controller for an industrial automation system, comprising:
an interface configured to receive one or more parameters for a control process in the industrial automation system;
a memory configured to store a dynamic selection component, wherein the dynamic selection component comprises:
one or more abstraction layers, comprising one or more modules, that specify higher level requirements of the process based at least in part on the one or more parameters; and
at least one execution layer, comprising at least one module that carries out the control process based at least in part upon the higher level requirements; and
at least one processor configured to translate the one or more parameters into the higher level requirements, communicate the higher level requirements to the at least one execution layer via the one or more abstraction layers, and execute the at least one execution layer based at least in part upon the higher level requirements.

\* \* \* \* \*